US007618232B2

(12) United States Patent
Bil et al.

(10) Patent No.: US 7,618,232 B2

(45) Date of Patent: Nov. 17, 2009

(54) COMPRESSOR COMPRISING A PLURALITY OF CELLS RECONSTITUTING AN ANNULAR VOLUME OF SEPARATION OF FLOWS IN A TURBINE ENGINE

(75) Inventors: Eric Stephan Bil, Chartrettes (FR); Gilles Alain Marie Charier, La Grande Paroisse (FR)

(73) Assignee: Snecma, Paris (FR)

( * ) Notice: Subject to any disclaimer, the term of this patent is extended or adjusted under 35 U.S.C. 154(b) by 342 days.

(21) Appl. No.: 11/465,998

(22) Filed: Aug. 21, 2006

(65) Prior Publication Data

US 2007/0039310 A1 Feb. 22, 2007

(30) Foreign Application Priority Data

Aug. 22, 2005 (FR) .................................. 05 08656

(51) Int. Cl.
*F01D 1/04* (2006.01)

(52) U.S. Cl. ....................... 415/69; 415/77; 416/193 R; 416/129; 60/226.1

(58) Field of Classification Search ................... 415/61, 415/68, 69, 77, 79, 144, 145, 209.1; 416/128, 416/129, 191, 193 R, 193 A, 194, 195, 196 R, 416/198 A, 248
See application file for complete search history.

(56) References Cited

U.S. PATENT DOCUMENTS

| | | | | |
|---|---|---|---|---|
| 1,544,318 | A * | 6/1925 | Hodgkinson | 416/193 R |
| 3,112,865 | A * | 12/1963 | Gisslen | 416/174 |
| 3,262,635 | A * | 7/1966 | Smuland | 417/355 |
| 3,264,482 | A * | 8/1966 | Clark et al. | 290/38 A |
| 3,330,475 | A * | 7/1967 | Dennison | 415/194 |
| 3,375,971 | A * | 4/1968 | Fitton | 415/209.4 |
| 3,486,328 | A * | 12/1969 | Boudigues | 60/39.181 |
| 3,546,882 | A * | 12/1970 | Berkey | 60/204 |
| 3,549,272 | A * | 12/1970 | Bouiller et al. | 416/166 |
| 3,673,802 | A | 7/1972 | Krebs et al. | |
| 3,729,957 | A * | 5/1973 | Petrie et al. | 60/226.1 |
| 4,860,537 | A * | 8/1989 | Taylor | 60/226.1 |
| 5,222,360 | A * | 6/1993 | Antuna et al. | 60/226.1 |
| 6,158,210 | A * | 12/2000 | Orlando | 60/226.1 |
| 6,666,017 | B2 * | 12/2003 | Prentice et al. | 60/226.1 |
| 6,732,502 | B2 * | 5/2004 | Seda et al. | 60/226.1 |
| 6,739,120 | B2 * | 5/2004 | Moniz et al. | 60/226.1 |
| 6,763,652 | B2 * | 7/2004 | Baughman et al. | 60/39.162 |

(Continued)

FOREIGN PATENT DOCUMENTS

EP 0 643 199 A1 3/1995

(Continued)

*Primary Examiner*—Edward Look
*Assistant Examiner*—Aaron R Eastman
(74) *Attorney, Agent, or Firm*—Oblon, Spivak, McClelland, Maier & Neustadt, L.L.P.

(57) ABSTRACT

This turbine engine compressor comprises a separating nose extended by inner and outer annular walls defining in cooperation an annular volume (V) of separation of a primary flow (F1) and a secondary flow (F2). This volume (V) comprises a plurality of annular segments in the form of cells separated in pairs by blades of a first fan, these blades passing through both the primary flow (F1) and the secondary flow (F2). These cells are fixed to an upstream annular collar and a downstream annular collar driven rotationally by the aforementioned blades.

10 Claims, 4 Drawing Sheets

U.S. PATENT DOCUMENTS

| | | | | |
|---|---|---|---|---|
| 6,763,654 | B2 * | 7/2004 | Orlando et al. | 60/226.1 |
| 7,299,621 | B2 * | 11/2007 | Bart et al. | 60/226.1 |
| 7,412,819 | B2 * | 8/2008 | Bart et al. | 60/226.1 |
| 2003/0200741 | A1 | 10/2003 | Moniz et al. | |
| 2005/0198941 | A1 * | 9/2005 | Bart et al. | 60/226.1 |
| 2006/0188369 | A1 * | 8/2006 | Charier et al. | 415/191 |

FOREIGN PATENT DOCUMENTS

| | | |
|---|---|---|
| FR | 2.036.093 | 12/1970 |

* cited by examiner

FIG.2
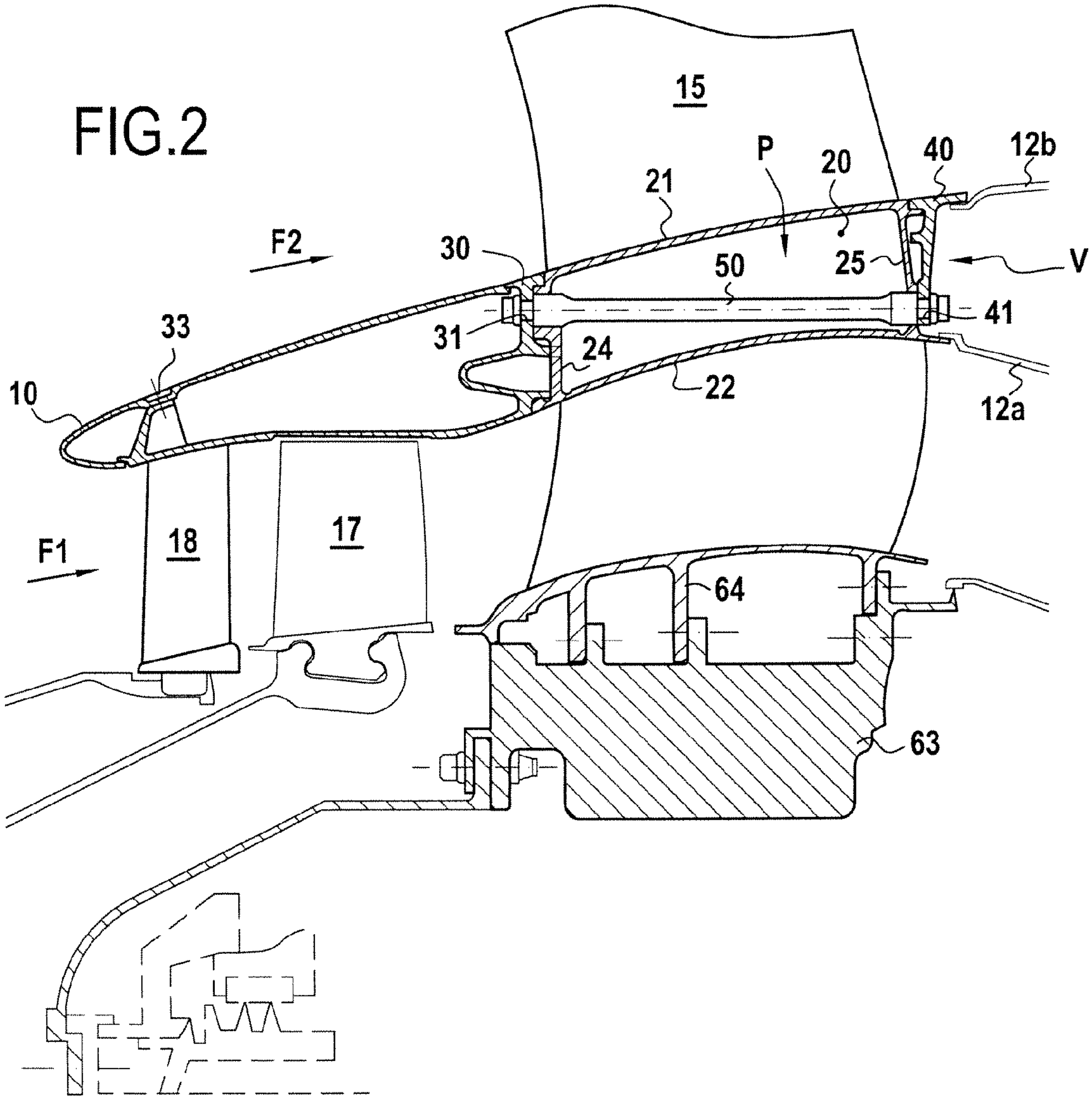
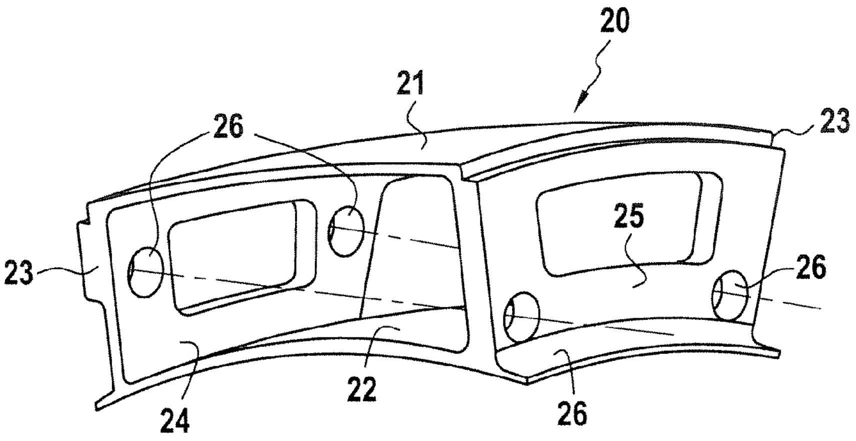
FIG.3

COMPRESSOR COMPRISING A PLURALITY OF CELLS RECONSTITUTING AN ANNULAR VOLUME OF SEPARATION OF FLOWS IN A TURBINE ENGINE

BACKGROUND OF THE INVENTION

The present invention relates to the general field of ducted fan turbine engine compressors.

It applies preferentially but is not limited to turbine engines comprising two counter-rotating fans.

The document EP 1 367 250 discloses a ducted fan turbine engine comprising a fan of which the blades of longitudinal main shape comprise three transverse fins.

In this arrangement, the first fins situated close to the blade base define, with the second intermediate fins, a portion of the stream of a primary flow, and the second intermediate fins define, with the third eccentric fins, a portion of the volume of separation of the two flows. Thus, the stream of the secondary flow is defined locally between the third eccentric fins and an outer housing.

According to this advantageous arrangement, the aforementioned blade passes through both the primary flow and the secondary flow. More precisely, the longitudinal portion of the blade lying between the first fin and the second intermediate fin passes radially through the primary flow, and the longitudinal portion of the blade situated to the outside of the third eccentric fin passes longitudinally through the secondary flow.

Persons skilled in the art will understand that such a blade of longitudinal general profile with three projecting transverse fins cannot be made from composite material, the constituent parts of an element made from composite material all having to be oriented substantially in the same direction.

OBJECT AND SUMMARY OF THE INVENTION

The invention therefore tackles the general problem of ducted fan turbine engine compressors in which the blades of a fan pass through both the primary flow and the secondary flow and in which in particular the blades can be produced from composite material.

To that end, the invention concerns, according to a first aspect, a turbine engine compressor comprising a separating nose extended by an inner annular wall and an outer annular wall defining in cooperation an annular volume of separation of a primary flow and a secondary flow. This volume comprises a plurality of annular segments in the form of cells separated in pairs by blades of a first fan, the blades passing through both the primary flow and the secondary flow, the cells being fixed to an upstream annular collar and a downstream annular collar driven rotationally by the blades.

In accordance with the invention, the segments of the annular volume separating the primary flow and the secondary flow consist of cells arranged between the blades of the first fan. Consequently, the profile of the blades passing through the primary flow and the secondary flow can be of conventional longitudinal type so that these blades can if necessary consist of composite material.

Preferably, the compressor according to the invention comprises a second fan with a first series of blades upstream of the separating nose, and a second series of blades positioned in the primary flow, the first and second fans being counter-rotating.

The invention also relates to a turbine engine comprising a compressor as mentioned above.

According to a second aspect, the invention relates to a cell comprising two first opposite walls, each having a shape adapted to define a segment of an annular volume of separation of a primary flow and a secondary flow in a compressor as mentioned above and two opposite sides separated by a distance substantially less than a distance separating two consecutive blades of the first fan and with shapes corresponding to the profile of these blades.

Preferentially, the cell is made from composite material.

Preferentially, this cell comprises second opposite walls, each comprising means of fixing the upstream and downstream annular collars.

In a first variant embodiment, the cell comprises at least one strut of which each of the two ends comprises a screw thread, the strut being arranged so that the screw threads are aligned with two through holes in the second opposite walls.

In this first variant, the cell preferentially comprises two struts.

In a second variant, the means of fixing the cell according to the invention comprise at least one bushing inserted in the thickness of each of the second walls.

Preferentially, in this second variant embodiment, the cell comprises four bushings, two for fixing to the upstream collar and two for fixing to the downstream collar.

According to a third aspect, the invention relates to an annular collar comprising a plurality of notches, each being adapted to receive an edge of a blade of the first fan of a compressor as mentioned above, so that the collar can be driven rotationally by the blades, and means for fixing the collar to a plurality of cells of this compressor.

Depending on whether the notches are adapted to receive the leading edge or trailing edge of the blades of the first fan, such a collar will be referred to as an “upstream collar”, respectively a “downstream collar”.

Preferentially, the upstream collar according to the invention comprises an end forming a support for the nose separating the primary flow and secondary flow in the compressor.

Preferably, this upstream collar comprises a plurality of radial blades positioned in the primary flow.

Persons skilled in the art will understand that these radial blades are driven rotationally by the blades of the first fan via the upstream collar.

BRIEF DESCRIPTION OF THE DRAWINGS

Other characteristics and advantages of the present invention will emerge from the description given below, with reference to the accompanying drawings which illustrate an example embodiment thereof without any limiting character. In the figures:

FIG. 2 depicts an enlargement of FIG. 1 centered on a zone of separation of these flows;

FIG. 3 depicts a cell in accordance with the invention in a preferred embodiment;

DETAILED DESCRIPTION OF EMBODIMENTS

Figure 1:
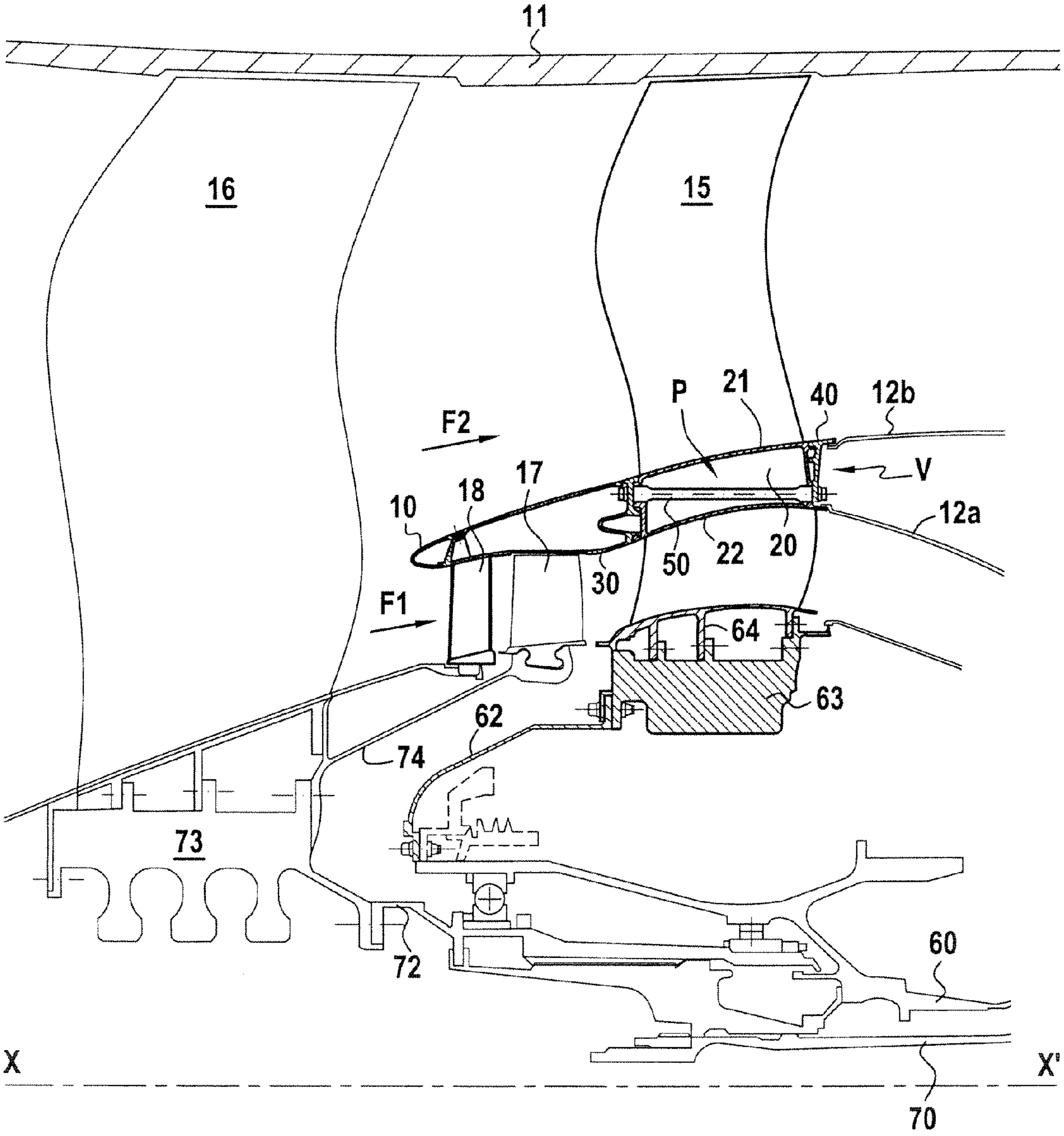
FIG. 1 is a half-view in longitudinal section of a ducted fan turbine engine compressor in accordance with the invention in a preferred embodiment.

FIGS. 1 and 2 depict a half-view in longitudinal section of a ducted fan compressor in accordance with the invention in a preferred embodiment.

This compressor delimited by an outer housing 11 comprises an axis of revolution referenced X-X' in FIG. 1.

In the embodiment described here, the compressor according to the invention comprises two counter-rotating fans.

In the embodiment described here, the first fan comprises blades 15 conveyed rotationally by a first longitudinal transmission shaft 60 terminated by a radial arm 62 to which there is fixed a support 63 for fixing the bases 64 of these blades 15.

In the embodiment described here, the second fan comprises a first series of blades 16 conveyed rotationally by a second longitudinal transmission shaft 70 extended by an arm 72 on which there is mounted a support 73 for fixing the bases of these blades 16.

In the embodiment described here, this first series of blades 16 is upstream of a nose 10 for separating the primary F1 and secondary F2 flows.

In the example described here, the second fan also comprises a second series of blades 17 driven rotationally by the second longitudinal transmission shaft 70 by means of an arm 74, this second series of blades 17 being positioned in the primary flow F1.

The primary flow F1 and the secondary flow F2 are separated by an annular volume referenced V, with axis of revolution X-X'.

This annular volume V of separation mainly consists of a separating nose 10 extended by an inner annular wall 12*a* and an outer annular wall 12*b*.

In accordance with the invention, the blades 15 of the first fan pass through both the primary flow F1 and the secondary flow F2. Also, at the level of these blades 15, the volume V of separation of the flows is constituted by annular segments P, each segment being constituted by a cell 20, these cells 20 being separated in pairs by the blades 15 of the first fan.

The cell 20 preferentially consists of composite material.

In accordance with the invention, the cells 20 comprise two first opposite walls, namely an upper wall 21 and a lower wall 22, the shapes of these walls being adapted to define a segment P of the annular volume V of separation of the primary flows F1 and the secondary flows F2.

More precisely, the shape of the lower wall 22 is adapted to reconstitute the upper envelope of the stream of the primary flow F1, and the upper wall 21, the lower envelope of the stream of the secondary flow F2 defined with the outer housing 11.

The cells 20 are placed between two consecutive blades 15 of the first fan. Consequently, these cells 20 have two opposite sides 23 separated by a distance substantially less than the distance separating two consecutive blades 15. The profile of the sides 23 of the cell 20 corresponds to the profile of the blades 15 of the first fan.

Preferentially, a seal, not depicted here, is positioned between the sides 23 of the cell 20 and the profiles of the blades 15.

In accordance with the invention, the cells 20 are fixed to an upstream annular collar 30 and a downstream annular collar 40, these collars being driven rotationally by the blades 15.

Figure 4:
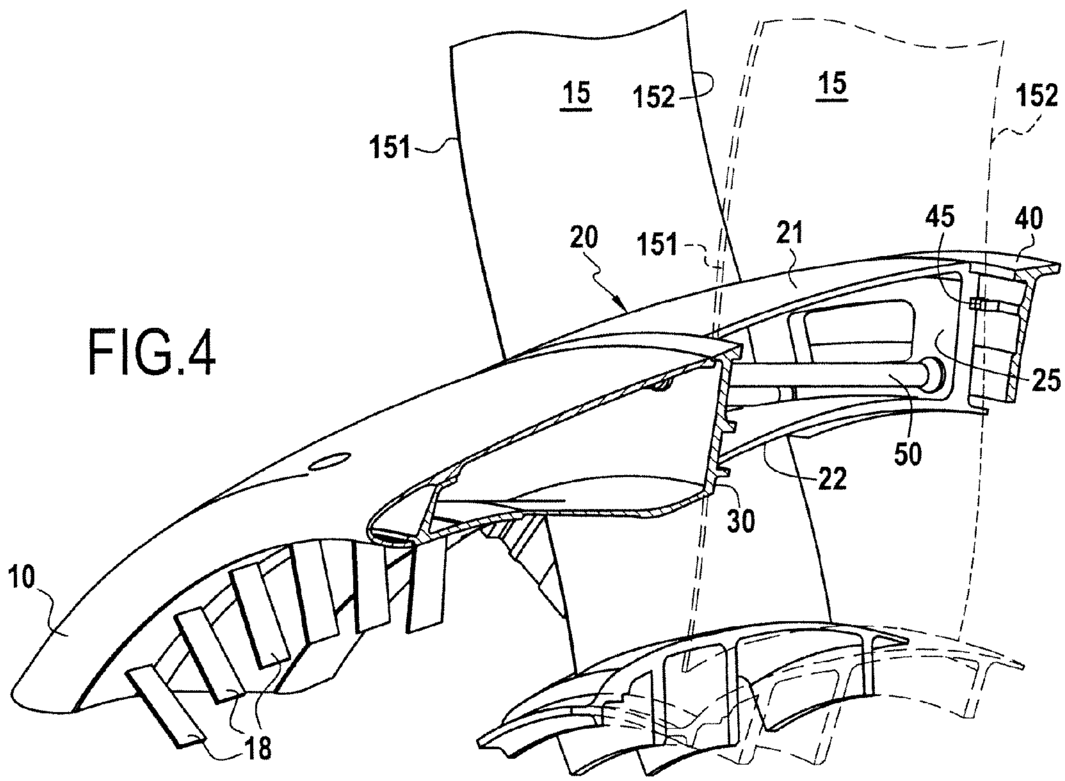
FIGS. 4 and 5 depict the arrangement of the cell of FIG. 3 in a turbine engine in accordance with the invention.
Figure 5:
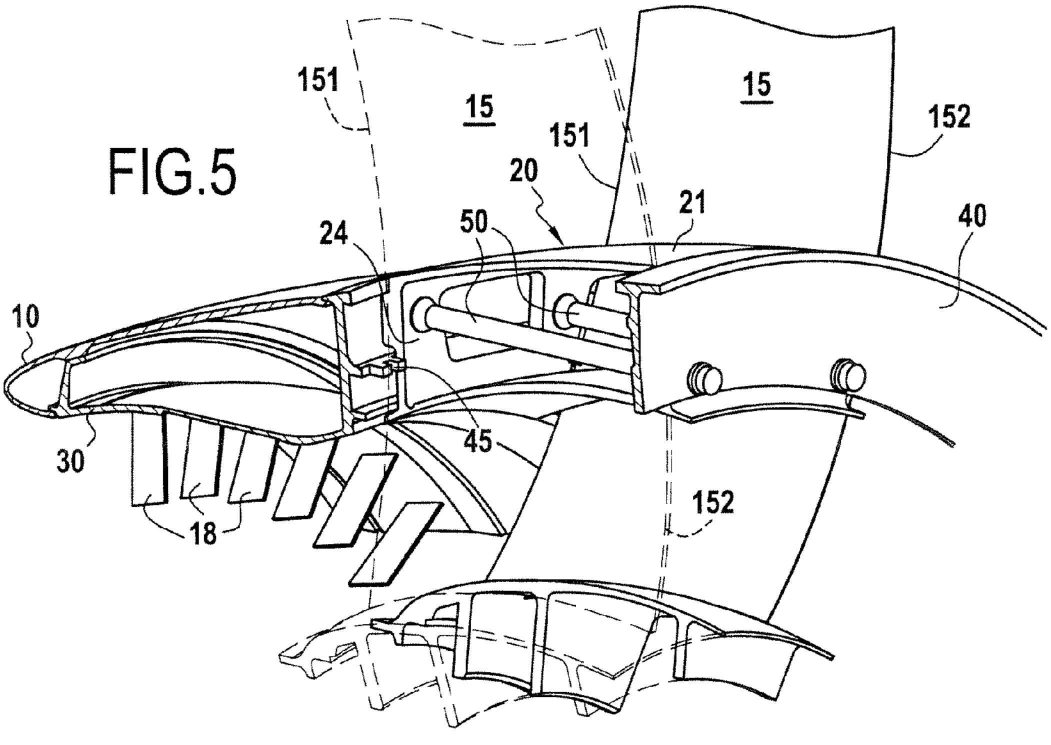

To that end, the upstream 30 and downstream 40 annular collars comprise notches 45 adapted to receive a leading edge 151, respectively trailing edge 152, of the blades 15 of the first fan as depicted in FIGS. 4 and 5.

Thus, when the blades 15 are conveyed rotationally by the transmission shaft 60, these blades, gripped in the notches 45 of the upstream 30 and downstream 40 collars, drive these collars rotationally.

In the preferred embodiment described here, the cell 20 in accordance with the invention comprises second opposite walls 24, 25, each of these walls comprising means of fixing to the upstream 30 and downstream 40 annular collars, so that these cells 20 are driven rotationally by means of the blades 15.

FIG. 3 depicts a cell in accordance with the invention in a first variant embodiment.

In this variant embodiment, the means of fixing the cell 20 comprise through holes 26 adapted to be aligned with corresponding through holes 41 and 31 made respectively in the downstream collar 40 and the upstream collar 30 (see FIG. 2).

In this preferred variant embodiment, the cell 20 comprises two struts 50 of which each end comprises a screw thread, the struts 50 being arranged so that this screw thread is aligned with the through holes 26 of the cell 20 and the through holes 31 and 41 of the upstream collar 30 and the downstream collar 40.

These struts 50 thus allow the fixing of the cell 20 to the upstream 30 and downstream 40 collars by screwing.

Figure 6:
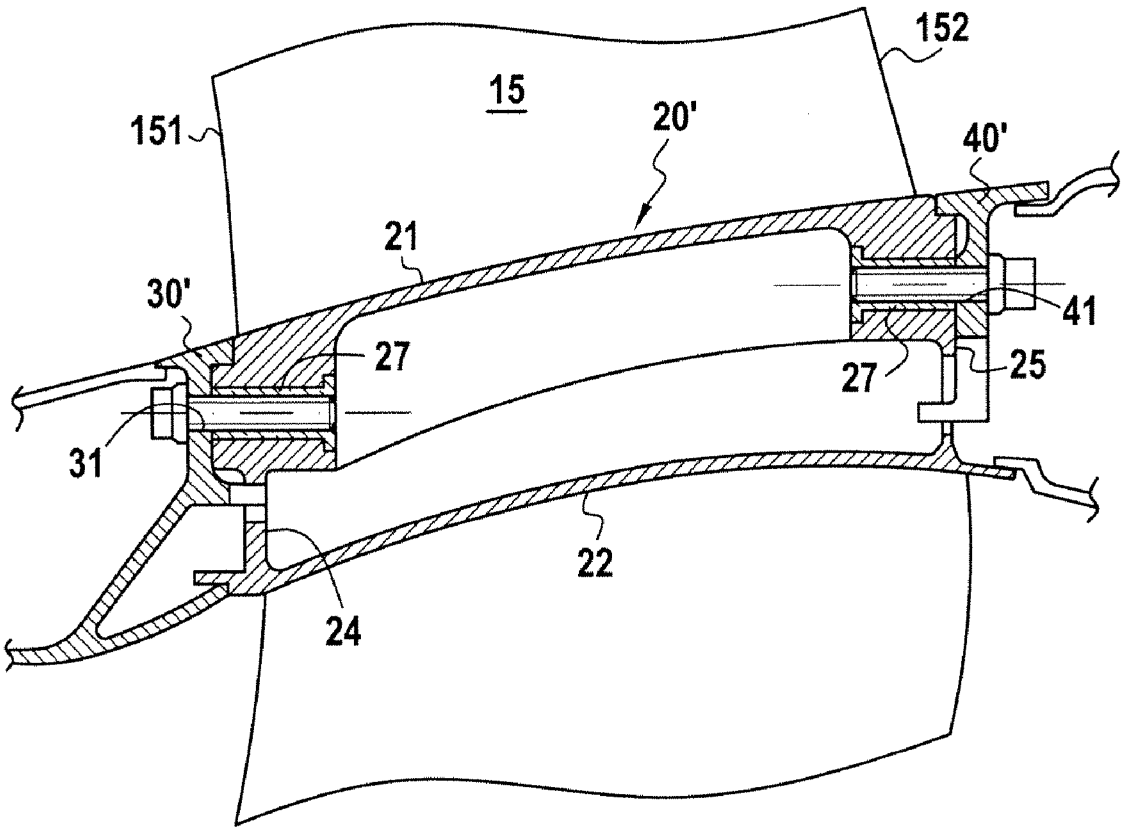
FIG. 6 depicts a cell in accordance with the invention in a second embodiment.

FIG. 6 depicts a cell 20' in accordance with the invention in a second variant embodiment.

This cell 20', preferentially made from composite material, is adapted to be fixed by screwing to an upstream annular collar 30' and a downstream annular collar 40', both in accordance with the invention. In this second variant embodiment, the means of fixing the cell 20' comprise bushings 27 inserted in the thickness of the second walls 24 and 25 of the cell 20'.

These bushings are arranged so that they can be positioned opposite a through hole 31 of the upstream collar 30' and a through hole 41 of the downstream collar 40'.

In the preferred embodiment of the invention described here, the upstream collar 30, 30' comprises an upstream end 33 forming a support for the separating nose 10. The separating nose 10 is preferentially fixed to this upstream part 33 of the upstream collar 30 by screws, not depicted.

In the preferred embodiment described here, the upstream collar 30, 30' comprises a plurality of radial blades 18 positioned in the primary flow F1.

These radial blades 18 are for example situated upstream of the second series of blades 17 of the second fan.

The invention claimed is:

1. A turbine engine compressor, comprising:

a separating nose extended by an inner annular wall and an outer annular wall defining in cooperation an annular volume and the nose is configured to separate a primary flow from a secondary flow, wherein said volume comprises a plurality of annular segments in the form of cells separated in pairs by blades of a first fan, said blades of a first fan passing through both said primary flow and said secondary flow, said cells being fixed to an upstream annular collar and a downstream annular collar driven rotationally by said blades.

2. The turbine engine compressor according to claim 1, wherein the compressor comprises a second fan with a first series of blades upstream of said separating nose, and a second series of blades positioned in said primary flow, the first fan and the second fan being counter-rotating.

3. A cell configured to be connected to a fan blade within a turbine engine compressor, comprising:

two first opposite walls, each of the two first opposite walls having a shape adapted to define a segment of an annular volume of separation of a primary flow and a secondary flow in the compressor;

second opposite walls, each of the second opposite walls comprising means of fixing to an upstream annular collar and a downstream annular collar, one of the second opposite walls configured to be attached to a separating nose through an inner annular wall and an outer annular wall defining in cooperation the annular volume of separation; and two opposite sides separated by a distance substantially less than a distance separating two consecutive blades of said first fan and with shapes corresponding to a profile of said blades, wherein said volume comprises a plurality of annular segments in the form of cells separated in pairs by blades of a first fan, said blades passing through both said primary flow and said secondary flow, said cells being fixed to an upstream annular collar and a downstream annular collar driven rotationally by said blades.

4. The cell according to claim 3, wherein at least one strut of which each of two ends of each of the at least one strut comprises a screw thread, said strut being arranged so that said screw threads are aligned with two through holes in said second opposite walls.

5. The cell according to claim 3, wherein said fixing means comprise at least one bushing inserted in a thickness of each of said second walls.

6. The cell as claimed in claim 3, wherein the cell consists of composite material.

7. A set of annular collars configured to be connected to a fan blade within a turbine engine compressor, each collar of the set of annular collars comprising:

a plurality of notches, each of the plurality of notches being adapted to receive an edge of a fan blade of a first fan of the compressor and the plurality of notches are configured to enable each of the annular collars to be driven rotationally by said blades of the first fan; and means for fixing said collar to a plurality of cells of said compressor, each of the annular collars configured to be connected to a plurality of cells separated in pairs by blades of the first fan, wherein the set of annular collars includes an upstream annular collar and a downstream annular collar, the upstream annular collar formed of an inner annular wall and an outer annular wall defining in cooperation an annular volume separating a primary flow and a secondary flow, the upstream annular collar extended by a separating nose configured to separate the primary flow and the secondary flow, the set of annular collars configured to enable the annular volume to be comprised of a plurality of annular segments formed of cells separated in pairs by blades of the first fan, and the set of annular collars configured to allow the blades of the first fan to pass through both said primary flow and said secondary flow.

8. The set of annular collars according to claim 7, wherein said notches connected to said upstream annular collar are adapted to receive a leading edge of the blade of said first fan, wherein said upstream annular collar comprises an upstream end forming a support for said nose separating the primary flow and secondary flow in said compressor.

9. The set of annular collars according to claim 8, wherein the upstream annular collar comprises a plurality of radial blades positioned in said primary flow.

10. A turbine engine, comprising:

a compressor including a separating nose extended by an inner annular wall and an outer annular wall defining in cooperation an annular volume of separation of a primary flow and a secondary flow, wherein said volume comprises a plurality of annular segments in the form of cells separated in pairs by blades of a first fan, said blades passing through both said primary flow and said secondary flow, said cells being fixed to an upstream annular collar and a downstream annular collar driven rotationally by said blades.

* * * * *